United States Patent
Kim (10) Patent No.: US 8,873,894 B2
(45) Date of Patent: Oct. 28, 2014

(54) POLARIZER

(75) Inventor: Jin Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 208 days.

(21) Appl. No.: 13/558,225

(22) Filed: Jul. 25, 2012

(65) Prior Publication Data

US 2013/0071060 A1    Mar. 21, 2013

(30) Foreign Application Priority Data

Sep. 21, 2011   (KR) ........................ 10-2011-0095278

(51) Int. Cl.
G02F 1/025      (2006.01)
G02B 6/00       (2006.01)

(52) U.S. Cl.
CPC ....................................... *G02B 6/00* (2013.01)
USPC ............................................... 385/2; 385/14

(58) Field of Classification Search
USPC ............................................. 385/11–16, 2–5
See application file for complete search history.

(56) References Cited

U.S. PATENT DOCUMENTS

| | | | |
|---|---|---|---|
| 4,697,868 A | 10/1987 | Thanivavarn | |
| 5,835,644 A | 11/1998 | Oh et al. | |
| 7,785,557 B2 | 8/2010 | Gruner et al. | |
| 8,306,184 B2 * | 11/2012 | Chang et al. | 378/62 |
| 8,384,991 B2 * | 2/2013 | Kieu et al. | 359/337 |
| 8,554,022 B1 * | 10/2013 | Hochberg et al. | 385/1 |
| 8,729,495 B2 * | 5/2014 | Hau et al. | 250/423 F |
| 2009/0190876 A1 | 7/2009 | Doi | |
| 2012/0251030 A1 * | 10/2012 | Delacour et al. | 385/2 |
| 2012/0281957 A1 * | 11/2012 | Chamanzar et al. | 385/131 |
| 2014/0056551 A1 * | 2/2014 | Liu et al. | 385/2 |

FOREIGN PATENT DOCUMENTS

KR        1020040094580 A       11/2004

* cited by examiner

*Primary Examiner* — Akm Enayet Ullah

(57) ABSTRACT

A polarizer includes: a substrate; a dielectric layer positioned on the substrate; an optical waveguide positioned in the dielectric layer and for transmitting incident light; and a graphene layer positioned corresponding to the optical waveguide.

17 Claims, 8 Drawing Sheets

POLARIZER

CROSS-REFERENCE TO RELATED APPLICATION

This application claims priority to and the benefit of Korean Patent Application No. 10-2011-0095278 filed in the Korean Intellectual Property Office on Sep. 21, 2011, the entire contents of which are incorporated herein by reference.

BACKGROUND OF THE INVENTION (a) Field of the Invention

The present invention relates to a polarizer.

(b) Description of the Related Art

Planar lightwave circuit (PLC) technology is technology for fabricating an optical element by forming an optical waveguide serving as an optical communication medium on a planar substrate such as a silicon wafer.

A typical optical waveguide polarizer as an optical waveguide-type optical element is provided with a thin metal line on an optical waveguide to filter an optical signal of a transverse magnetic (TM) mode and pass an optical signal of a transverse electric (TE) mode.

However, such an optical waveguide polarizer exhibits a polarization characteristic, which depends on the wavelength of an optical signal which is in turn dependant on the length, width, and thickness of the metal line.

SUMMARY OF THE INVENTION

The present invention has been made in an effort to provide a polarizer having wide wavelength selectivity and bandwidth.

An exemplary embodiment of the present invention provides a polarizer for polarizing light. The polarizer may include: a substrate; a first dielectric layer positioned on the substrate; a second dielectric layer positioned on the first dielectric layer; an optical waveguide positioned in the second dielectric layer and for transmitting incident light; a third dielectric layer positioned on the second dielectric layer; and a graphene layer positioned corresponding to the optical waveguide.

The polarizer may be a TE-mode pass polarizer for passing only a transverse electric (TE) mode component.

The graphene layer may be formed of a single layer or multiple layers.

The graphene layer may be positioned on the third dielectric layer.

The graphene layer may be positioned in the third dielectric layer.

The graphene layer may be positioned directly above the optical waveguide.

The optical waveguide may have a different refractive index from that of the first dielectric layer.

The optical waveguide may be made of a conductive material.

The polarizer may further include: a fourth dielectric layer formed on the graphene layer; a metal thin film formed on the fourth dielectric layer to correspond to the graphene layer; and a voltage supply unit for applying an asset voltage between the metal thin film and the optical waveguide.

The polarizer may further include a voltage supply unit for applying a set voltage between the graphene layer and the optical waveguide.

The set voltage may be an alternating current voltage.

Another embodiment of the present invention provides a polarizer including: a substrate; a first dielectric layer positioned on the substrate; an optical waveguide positioned in the first dielectric layer and for transmitting incident light; and a graphene layer positioned corresponding to the optical waveguide and for polarizing the light transmitted from the optical waveguide.

The graphene layer may be positioned directly above the optical waveguide, or is spaced apart from the optical waveguide and positioned in the first dielectric layer or directly above the first dielectric layer.

The polarizer may further include: a second dielectric layer formed on the graphene layer; a metal thin film formed on the second dielectric layer to correspond to the graphene layer; and a voltage supply unit for applying an alternating current voltage or direct current voltage between the metal thin film and the optical waveguide.

The polarizer may further include a voltage supply unit for applying an alternating current voltage or direct current voltage between the graphene layer and the optical waveguide.

The graphene layer may be doped with a conductive dopant.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a polarizer according to an exemplary embodiment of the present invention will be described in detail with reference to the drawings.

Figure 1:
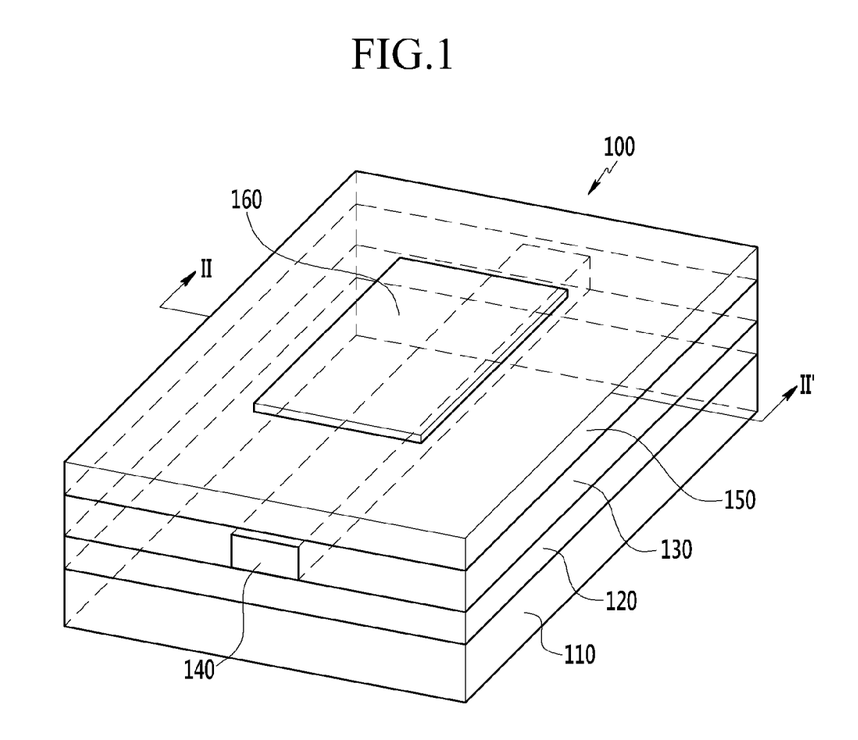
FIG. 1 is a perspective view showing a polarizer according to a first exemplary embodiment of the present invention.
Figure 2:
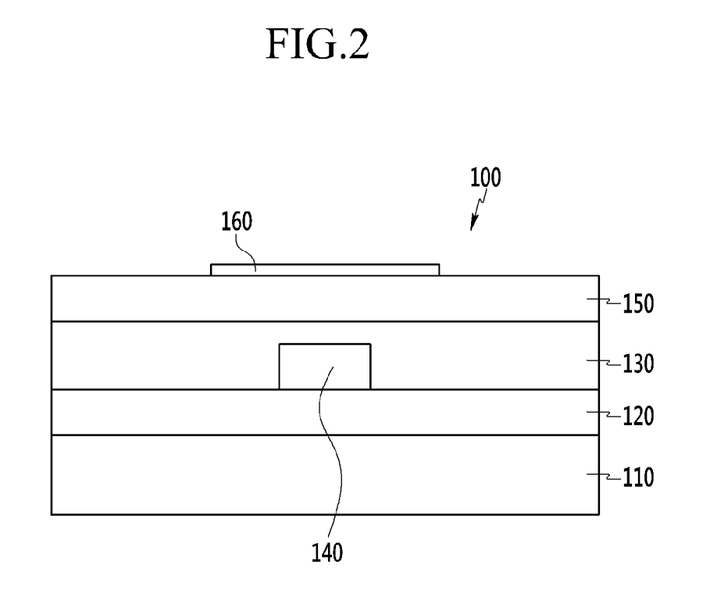
FIG. 2 is a cross-sectional view taken along line II-II' of FIG. 1.

FIG. 1 is a perspective view showing a polarizer according to a first exemplary embodiment of the present invention, and FIG. 2 is a cross-sectional view taken along line II-II' of FIG. 1.

Referring to FIG. 1 and FIG. 2, a polarizer 100 includes a substrate 110, a first dielectric layer 120 formed on the substrate 110, a second dielectric layer 130 positioned on the first dielectric layer 120, an optical waveguide 140 positioned in the second dielectric layer 130, a third dielectric layer 150 positioned on the second dielectric layer 130, and a graphene layer 160 positioned on the third dielectric layer 150.

The substrate 110 may be made of glass, quartz, silicon, or the like.

The first dielectric layer 120, the second dielectric layer 130, and the third dielectric layer 150 may be made of silicon oxide or silicon nitride. Alternatively, the first dielectric layer 120, the second dielectric layer 130, and the third dielectric layer 150 may be made of a polymer for use in optical devices.

Although the first dielectric layer 120, the second dielectric layer 130, and the third dielectric layer 150 have been described as different layers for convenience of explanation, they may be formed of the same material.

The first dielectric layer 120, the second dielectric layer 130, and the third dielectric layer 150 may be individually formed according to a fabrication method. However, the first dielectric layer 120 and the second dielectric layer 130 may be simultaneously formed, or the second dielectric layer 130 and the third dielectric layer 150 may be simultaneously formed.

The optical waveguide 140 is formed along the length direction of the substrate 110.

The optical waveguide 140 may be formed of a material having a difference in refractive index from those of the first dielectric layer 120, the second dielectric layer 130, and the third dielectric layer 150. That is, the optical waveguide 140 has a different refractive index from those of the first dielectric layer 120, the second dielectric layer 130, and the third dielectric layer 150. For example, the optical waveguide 140 may be formed of a material having a higher refractive index than those of the first dielectric layer 120, the second dielectric layer 130, and the third dielectric layer 150, for example, silicon, silicon nitride, or a polymer for optical elements.

The optical waveguide 140 transmits an optical signal by using a refractive index difference, etc. That is, if the refractive index of the optical waveguide 140 is higher than those of the second dielectric layer 130 and third dielectric layer 150, an optical signal can be transmitted as the optical signal that is totally reflected toward the optical waveguide 140.

The graphene layer 160 is formed on the third dielectric layer 150 to correspond to the optical waveguide 140.

The graphene layer 160 is a very thin layer made of graphene. Graphene, which is a material consisting of carbon atoms connected together in a honeycomb-like thin planar structure, has electrical properties. Carbon atoms are held together to form a single carbon atom layer, and graphene may consist of a single layer or multiple layers of carbon atoms. A single layer graphene 160 has a thickness of one carbon atom. The carbon atoms form six-membered rings, five-membered rings, or seven-membered rings as a repeating unit.

The graphene layer 160 may be formed by a simple photolithography process.

When light is guided to the surface of graphene, an electronic surface wave, called surface plasmon, is generated. Surface plasmon refers to an oscillating charge density wave which is formed by an interaction between free electrons and externally incident light, and travels along the interface between a material having free electrons and a dielectric material adjoining the material.

In the case of graphene, light of the TM mode or TE mode may travel along graphene depending on the chemical potential level of the graphene. For example, if the chemical potential is higher than $\hbar\omega/2$, the intraband imaginary part contributing to the conductivity of the graphene is higher than the interband imaginary band. Thus, the imaginary part of the overall conductivity of the graphene becomes negative. In this case, the graphene can waveguide the TM-mode light. Otherwise, if the chemical potential is lower than $\hbar\omega/2$, the graphene waveguides the TE-mode light. Here, $\hbar=h/2\pi$, h indicates a planck constant (6.626068×10−34 m2 kg/s), and $\omega$ indicates an angular frequency.

Using this principle, if the graphene is placed near the optical waveguide 140 having a rectangular or circular shape, the TM-mode light, of the light traveling along the optical waveguide 140, is coupled to the adjacent graphene layer 160 and travels along the graphene, and the TE-mode light travels only along the optical waveguide 140. Once the TM-mode light traveling along the graphene has traveled a certain distance, it becomes weaker in intensity and is extinguished due to a loss of electrons in the graphene. As a result, the TE-mode light traveling along the optical waveguide 140 travels without any loss, and hence a TE-mode pass polarizer can be achieved. Consequently, it is possible to fabricate a TE-mode pass polarizer for passing TE-mode components therethrough by forming the graphene layer 160 so as to correspond to the optical waveguide 140.

Moreover, the thus-fabricated TE-mode pass polarizer can have a wide bandwidth because graphene has no energy bandgap and can therefore interact with light of all wavelengths.

Figure 3:
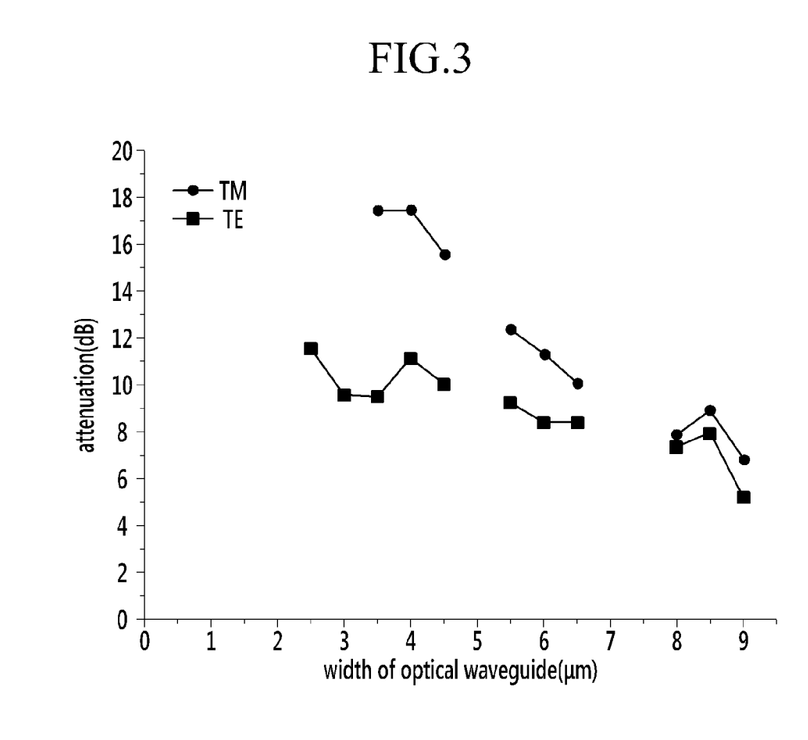
FIG. 3 is a view showing the test results of optical signal attenuation of a polarizer according to an exemplary embodiment of the present invention.

FIG. 3 is a view showing the test results of optical signal attenuation of a polarizer according to an exemplary embodiment of the present invention.

Specifically, FIG. 3 illustrates the optical attenuation level dB of the light output from the optical waveguide 140 versus the width of the optical waveguide 140 when light is incident on the optical waveguide 140 with the graphene layer 160 formed thereon according to a first exemplary embodiment of the present invention.

As shown in FIG. 3, it can be seen that, if light is incident on the optical waveguide 140 with the graphene layer 160 formed thereon according to the first exemplary embodiment of the present invention, the attenuation of the TM mode component of the light output from the optical waveguide 140 is greater than the attenuation of the TE mode component. There may be a difference between the optical loss of the TE mode component and the optical loss of the TM mode component depending on the width of the optical waveguide 140. Here, a high attenuation level indicates a low intensity. Thus, it can be seen that the polarizer 100 according to an exemplary embodiment of the present invention is a TE-mode pass polarizer.

Meanwhile, the attenuation level of an optical signal of the TM-mode component may vary according to the position of the graphene layer 160. Particularly, the longer the distance between the optical waveguide 140 and the graphene layer 160, the lower the attenuation level of the TM mode. Accordingly, a variety of polarizers can be fabricated according to the position of the graphene layer 160.

Figure 4:
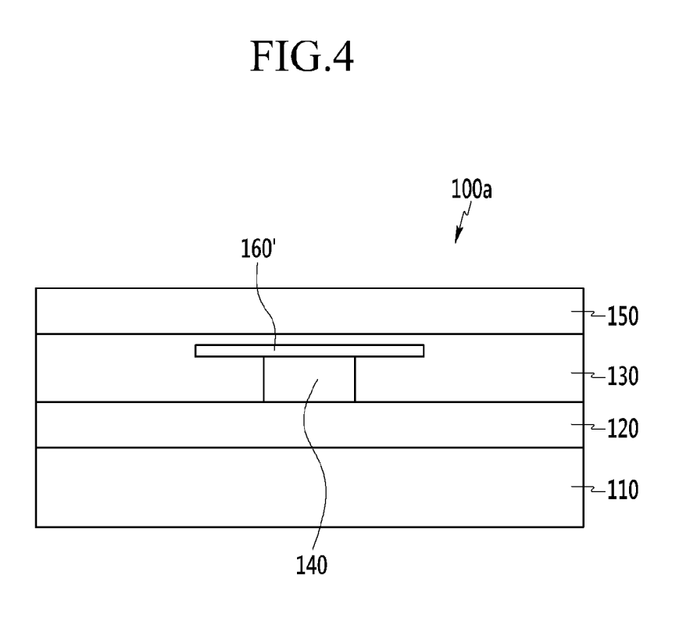
FIG. 4 and FIG. 5 are views respectively showing polarizers according to second and third exemplary embodiments of the present invention.
Figure 5:
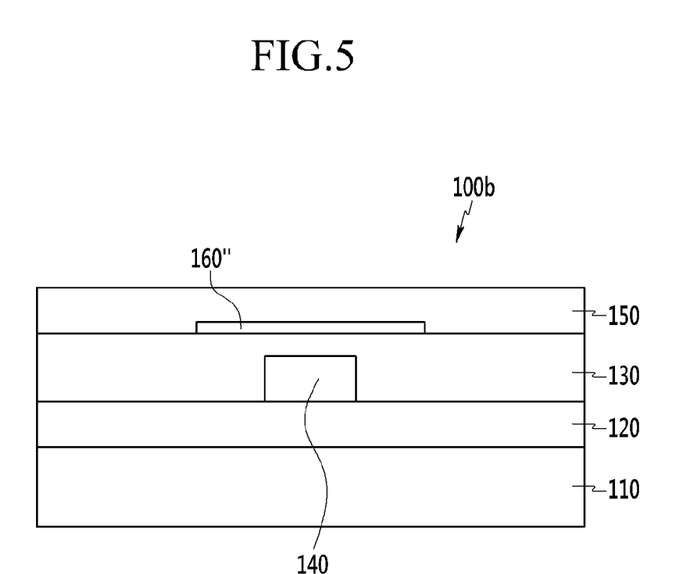

FIG. 4 and FIG. 5 are views respectively showing polarizers according to second and third exemplary embodiments of the present invention.

As shown in FIG. 4, unlike the graphene layer 160 according to the first exemplary embodiment, the graphene layer 160' of the polarizer 100a may be positioned directly above the optical waveguide 140. In this case, the graphene layer 160' is formed in the second dielectric layer 130.

Referring to FIG. 5, the graphene layer 160" of the polarizer 100b may be positioned in the third dielectric layer 150 at a predetermined distance from the optical waveguide 140. The graphene layer 160" may be formed on the second dielectric layer 130.

Also, the chemical potential of graphene may vary by doping it or by applying an electric field to the graphene. Accordingly, if the graphene is doped or an electric field is applied to the graphene, light of the TM mode or TE mode may be selectively polarized, or the attenuation level thereof may be adjusted. In what follows, the polarizer according to this exemplary embodiment will be described.

Figure 6:
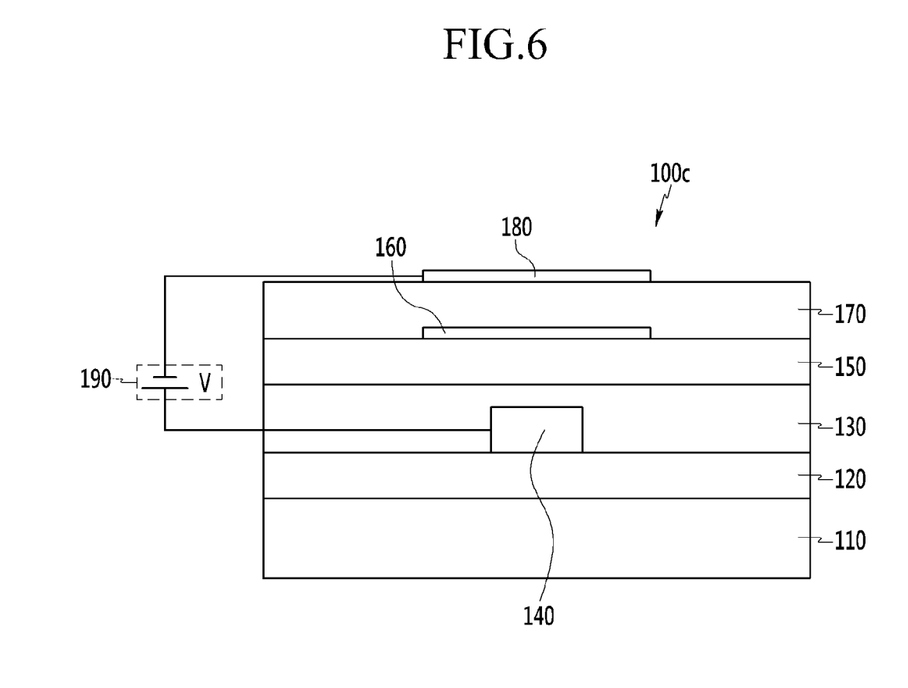
FIG. 6 to FIG. 8 are views respectively showing polarizers according to fourth to sixth exemplary embodiments of the present invention.
Figure 7:
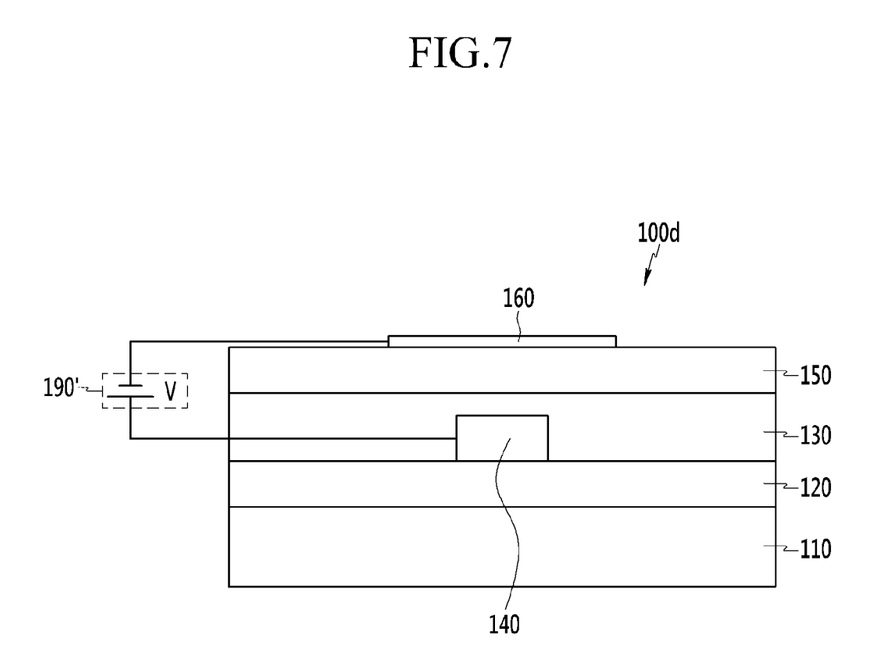
Figure 8:
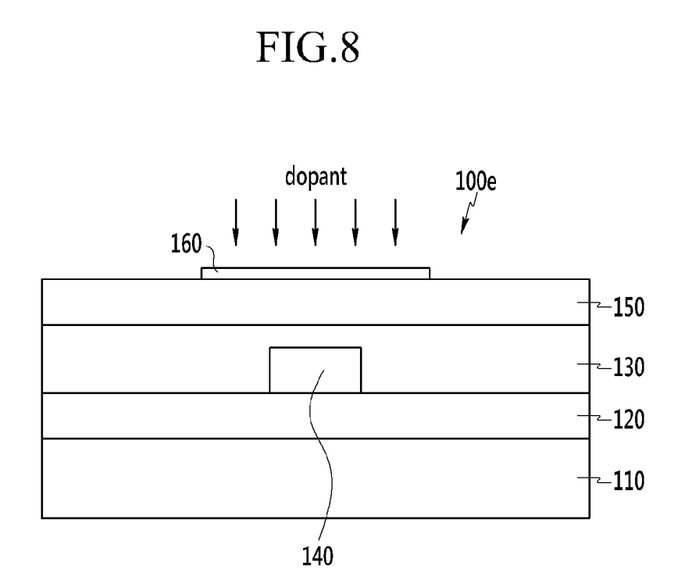

FIG. 6 to FIG. 8 are views respectively showing polarizers according to fourth to sixth exemplary embodiments of the present invention.

FIG. 6 to FIG. 8 illustrate modified examples of the polarizer 100 shown in FIG. 1, which may be equally applicable to the polarizers 100a and 100b shown in FIGS. 4 and 5.

First, referring to FIG. 6, the polarizer 100c may further include a fourth dielectric layer 170, a metal thin film 180, and a voltage supply unit 190, as compared to the polarizer 100 according to the first exemplary embodiment.

The fourth dielectric layer 170 is formed above the graphene layer 140, and the thin metal film 180 is formed above the fourth dielectric layer 170.

If the optical waveguide 140 is composed of a conductive material such as silicon (Si), the voltage supply unit 190 may apply an electric field to the graphene by applying an alternating current voltage or direct current voltage (V) between the metal thin film 180 and the optical waveguide 140. If an electric field is applied to the graphene, the chemical potential of the graphene varies due to a change in the characteristics of surface plasmon polaritons induced by a change in the density of charge carriers, and therefore an optical loss of the TM/TE mode varies. Consequently, a change in voltage applied between the metal thin film and the optical waveguide 140 may lead to a change in the polarization characteristics of the polarizer.

Moreover, when an alternating current voltage is applied between the metal thin film 170 and the optical waveguide 140, the intensity of polarized light may vary periodically.

Also, the graphene has electrical properties. Hence, if the optical waveguide 140 is composed of a conductive material such as silicon (Si), the voltage supply unit 190' may apply an electric field to the graphene by applying an alternating current voltage or direct current voltage (V) between the graphene layer 160 and the optical waveguide 140, as shown in FIG. 7, The chemical potential of the graphene with an electric field applied thereto varies, and therefore optical loss of the TM/TE mode may vary. Consequently, the polarization characteristics of the polarizer 100d may vary with changes in the voltage applied between the graphene and the optical waveguide 140.

Moreover, the intensity of polarized light may vary periodically by applying an alternating current voltage between the graphene and the optical waveguide.

Unlike FIG. 6 and FIG. 7, referring to FIG. 8, the polarizer 100e is identical to the polarizer 100 except that the graphene layer 160 is doped with a conductive dopant. By doping the graphene layer 160 with a conductive dopant, the chemical potential of the graphene varies, and therefore optical loss of the TM/TE mode may vary.

According to an exemplary embodiment of the present invention, a polarizer can be fabricated which has wide wavelength selectivity and bandwidth by polarizing an optical signal traveling along an optical waveguide by the use of graphene. Moreover, a variety of polarizers can be fabricated by applying to a functional optical device to which a variety of planar optical circuit structures are applicable.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polarizer, comprising:
a substrate;
a first dielectric layer positioned on the substrate;
a second dielectric layer positioned on the first dielectric layer;
an optical waveguide positioned in the second dielectric layer and for transmitting incident light;
a third dielectric layer positioned on the second dielectric layer; and
a graphene layer positioned corresponding to the optical waveguide.

2. The polarizer of claim 1, wherein the polarizer is a TE-mode pass polarizer for passing only a transverse electric (TE) mode component.

3. The polarizer of claim 1, wherein the graphene layer is formed of a single layer or multiple layers.

4. The polarizer of claim 1, wherein the graphene layer is positioned on the third dielectric layer.

5. The polarizer of claim 1, wherein the graphene layer is doped with a conductive dopant.

6. The polarizer of claim 1, wherein the graphene layer is positioned on the third dielectric layer.

7. The polarizer of claim 1, wherein the optical waveguide has a different refractive index from that of the first dielectric layer.

8. The polarizer of claim 1, wherein the optical waveguide is made of silicon, silicon nitride, or a polymer for use in optical devices.

9. The polarizer of claim 1, wherein the optical waveguide is made of a conductive material.

10. The polarizer of claim 9, further comprising:
a fourth dielectric layer formed on the graphene layer;
a metal thin film formed on the fourth dielectric layer to correspond to the graphene layer; and
a voltage supply unit for applying a set voltage between the metal thin film and the optical waveguide.

11. The polarizer of claim 9, further comprising a voltage supply unit for applying a set voltage between the graphene layer and the optical waveguide.

12. The polarizer of claim 10, wherein the set voltage is an alternating current voltage.

13. A polarizer comprising:
a substrate;
a first dielectric layer positioned on the substrate;
an optical waveguide positioned in the first dielectric layer and for transmitting incident light; and
a graphene layer positioned corresponding to the optical waveguide and for polarizing the light transmitted from the optical waveguide.

14. The polarizer of claim 13, wherein the graphene layer is formed of a single layer or multiple layers.

15. The polarizer of claim 13, further comprising:
a second dielectric layer formed on the graphene layer;

a metal thin film formed on the second dielectric layer to correspond to the graphene layer; and a voltage supply unit for applying an alternating current voltage or direct current voltage between the metal thin film and the optical waveguide.

16. The polarizer of claim 13, further comprising a voltage supply unit for applying an alternating current voltage or direct current voltage between the graphene layer and the optical waveguide.

17. The polarizer of claim 13, wherein the graphene layer is doped with a conductive dopant.

* * * * *